(12) United States Patent
Canagasaby et al.

(10) Patent No.: US 7,596,174 B2
(45) Date of Patent: Sep. 29, 2009

(54) EQUALIZING A TRANSMITTER

(75) Inventors: Karthisha S. Canagasaby, Santa Clara, CA (US); Muraleedhara Navada, Santa Clara, CA (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 11/237,118

(22) Filed: Sep. 28, 2005

(65) Prior Publication Data

US 2007/0071083 A1    Mar. 29, 2007

(51) Int. Cl.
*H04B 7/30* (2006.01)
(52) U.S. Cl. ........................................ 375/229
(58) Field of Classification Search .................. 375/229, 375/232, 257, 285, 226, 371, 373, 376; 327/158, 327/161, 149, 152
See application file for complete search history.

(56) References Cited

U.S. PATENT DOCUMENTS

| | | | |
|---|---|---|---|
| 3,835,252 A * | 9/1974 | Ananiades et al. .......... 375/257 |
| 6,009,488 A | 12/1999 | Kavipurapu ................. 710/105 |
| 6,437,713 B1 * | 8/2002 | Lesea ........................... 341/78 |
| 6,507,225 B2 | 1/2003 | Martin et al. ................ 327/108 |
| 6,567,467 B1 | 5/2003 | Wu .............................. 375/233 |
| 6,788,098 B1 * | 9/2004 | Alani et al. .................... 326/16 |
| 6,794,913 B1 * | 9/2004 | Stengel ........................ 327/158 |
| 6,801,043 B2 | 10/2004 | Tripathi et al. .............. 324/642 |
| 7,114,069 B2 * | 9/2006 | Tomerlin et al. ............ 713/100 |
| 7,295,618 B2 * | 11/2007 | Hsu et al. .................... 375/257 |
| 2004/0264616 A1 | 12/2004 | Canagasaby et al. ........ 375/359 |
| 2005/0201454 A1 | 9/2005 | Chaudhuri et al. .......... 375/299 |

* cited by examiner

*Primary Examiner*—Khanh C Tran
(74) *Attorney, Agent, or Firm*—Trop, Pruner & Hu, P.C.

(57) ABSTRACT

In one embodiment, the present invention includes a method for associating a first plurality of current sources with a first tap coefficient and associating a second plurality of current sources with a second tap coefficient. A first plurality of output switches coupled to the first plurality of current sources is gated using the first tap coefficient and a second plurality of output switches coupled to the second plurality of current sources is gated using the second tap coefficient. In such manner, the first and second plurality of equalized current sources may be driven onto an interconnect. Other embodiments are described and claimed.

25 Claims, 6 Drawing Sheets

EQUALIZING A TRANSMITTER

BACKGROUND

Embodiments of the present invention relate generally to integrated circuit (IC) interfaces, and more specifically to integrated circuit interfaces having equalization capabilities.

Integrated circuits typically have dedicated interfaces to communicate within and outside of a system. Signals communicated via ICs continue to be transmitted at higher speeds. As these signal speeds increase, the effect of imperfect channels or interconnects through which the signal passes also increases. For example, a channel may be a circuit board trace or a wire routed between integrated circuits. Depending on the characteristics of the interconnect, frequency dependent attenuation of signal amplitude may occur. In general, when the signal amplitude is attenuated as a function of frequency, the signal becomes smaller as the speed increases. When the signal gets too small, communications between devices can become unreliable.

Furthermore, a transmitted symbol may be misinterpreted by a receiver because of lingering effects associated with symbols that were previously transmitted via an interconnect. For example, a significant amount of voltage might remain on the interconnect after a long series of logic one values are transmitted. As a result, a receiver may mistakenly interpret a newly transmitted logic zero value as a logic one. Such problems, referred to as inter-symbol interference (ISI), can limit data rates. ISI can also vary based on frequency dependent insertion loss characteristics of an interconnect, and this interference increases at higher transfer rates.

To reduce these problems, different equalization systems can be associated with an interconnect. As an example, passive equalization networks can be used with an interconnect. Such an approach, however, can introduce additional insertion loss in the link. Moreover, a network topology, and the values of associated components, is highly dependent on the insertion loss characteristics of the particular interconnect (which might not be known at the time the passive equalization network is designed). Similarly, active equalization may be implemented at a transmitter or receiver to equalize the channel. For example, an adaptive-tapped delay line filter may be designed to cancel out frequency dependent loss characteristics of an interconnect. In this case, however, the appropriate filter coefficients will depend on the particular interconnection media and topology, which may change over time, requiring continual adjusting of filter coefficients.

Many equalizers use fixed taps that cannot thereafter be adjusted. This is disadvantageous for a number of reasons. For example, the number of taps and filter coefficient settings for one medium or channel may not be optimal or may not even work with another channel. To overcome these inconsistencies, users may manually vary certain parameters of the filter to make the link work for different channels, taking into consideration bit-rate as well as other variables. However, this is time inefficient, and also undermines system flexibility and adaptability.

DETAILED DESCRIPTION

In various embodiments, transmitter equalization may be performed via an apparatus that uses a fixed (i.e., pre-programmed) filter that generates one or more filter taps that are in turn provided to a plurality of multiplexers. These multiplexers may be controlled to pass a selected one of the taps to driver circuitry associated with the particular multiplexer. All of the driver outputs may then be summed to generate an output signal for transmission on an interconnect.

As used herein, the term "interconnect" refers to any path or medium through which data is transmitted. An interconnect may be associated with, for example, a serial point-to-point interface between a transmitter and a receiver (e.g., different ICs). Note that an interconnect may be a wire, a printed circuit board trace, or any other media (or combinations of media).

As will be discussed further below, equalization in accordance with an embodiment of the present invention may be used in various systems. For example, embodiments may be used in serial-based interconnect systems, such as various point-to-point interconnect systems, a system using a PCI Express™ architecture in accordance with the Peripheral Component Interconnect (PCI) Express Base Specification, Rev. 1.0 (published Jul. 22, 2002), a 10 Gigabits per second Extended Attachment Unit Interface (XAUI) device, or another such system. Accordingly, various devices such as ICs or other system components may include equalization circuitry to equalize a signal to be transmitted in accordance with an embodiment of the present invention. Equalization circuitry in accordance with other embodiments may be implemented in repeaters or other signal conditioning circuitry associated with circuit boards or their interconnects in larger systems, such as server-based systems.

Figure 1:
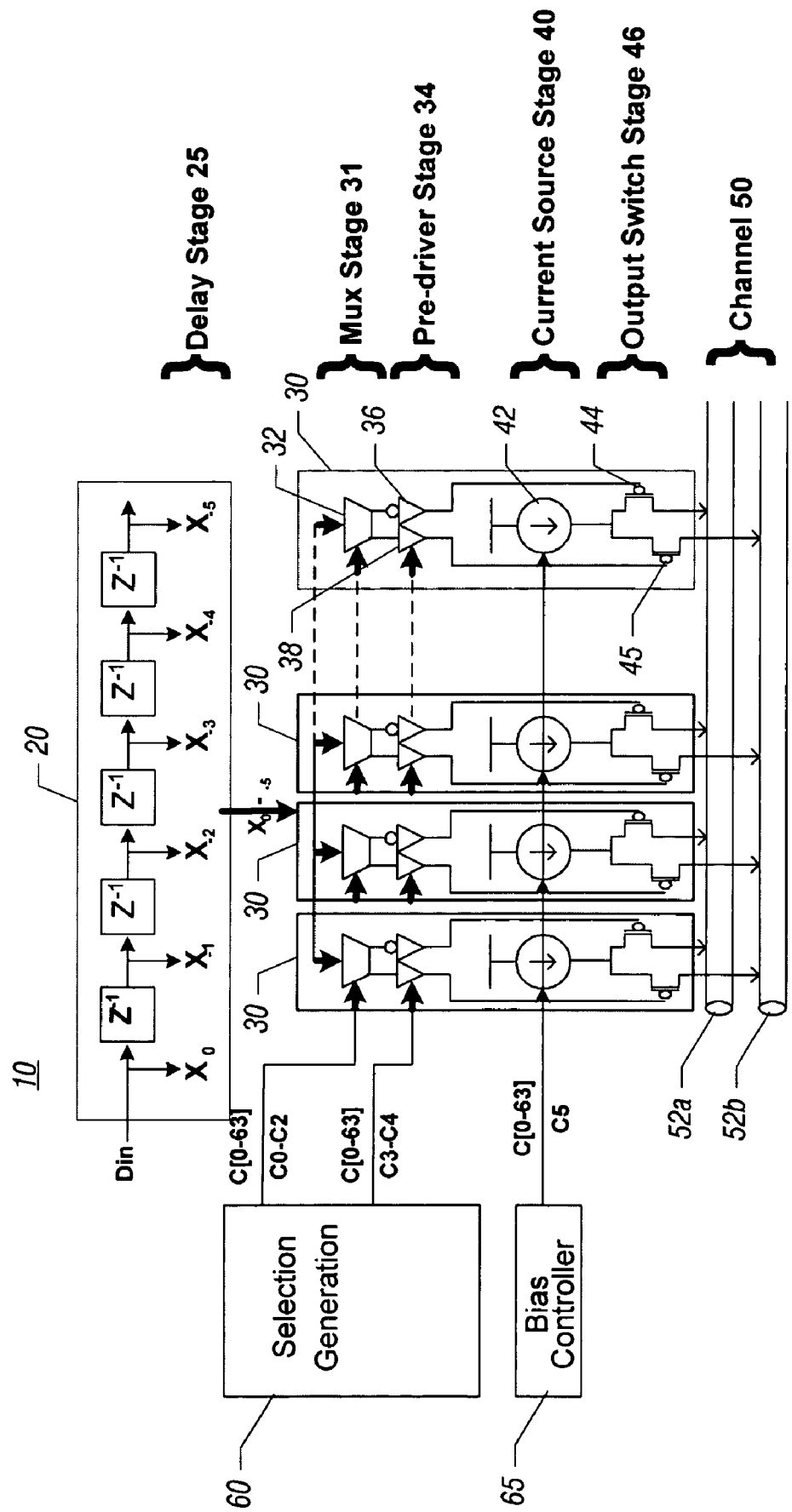
FIG. 1 is a block diagram of an equalizer in accordance with one embodiment of the present invention.

Referring now to FIG. 1, shown is a block diagram of an equalizer 10 in accordance with one embodiment of the present invention. As shown in FIG. 1, equalizer 10 includes a delay stage 25 formed of a filter 20, which in some embodiments may be a time-varying finite impulse response (FIR) filter, having an input $D_{in}$ that varies depending upon the instantaneous state of data to be transmitted. Filter 20 includes five delay elements (all designated as $Z^{-1}$ in the embodiment of FIG. 1) and six taps $X_0$ through $X_{-5}$. The outputs of the taps are provided to each of a plurality of drivers 30, each of which is coupled to a physical channel 50. Although channel 50 is shown in the embodiment of FIG. 1 as a differential channel having a positive branch 52a and a negative branch 52b, in other embodiments single-ended channels are possible.

Because the majority of optimum transmitter equalization coefficients are known for a given type of system in which an equalizer is located, in various embodiments preselected coefficients for tap coefficients of an equalizer filter may be provided to all drivers for selection of a tap coefficient to drive the driver. That is, equalizer 10 is a decoder-based architecture in which filter 20 has coefficients pre-programmed. In such manner, extremely low latency and low power levels may be used, as no computation cycles are spent on computing coefficients. Thus delay stage 25 directly transfers known coefficients to each of a plurality of individual drivers 30.

Still referring to FIG. 1, each driver 30 is coupled to receive the tap coefficients $X_0$-$X_{-5}$. While shown in the embodiment of FIG. 1 as including six tap coefficients, it is to be understood that in other embodiments a filter may include a different number of coefficients and delay elements. These delay elements may be used to generate pre-cursors, cursor and post-cursors. Different numbers of tap coefficients may be present depending upon desired frequencies of operation, length of interconnect, or other physical features of a system and its interconnects. As shown in FIG. 1, driver 30 may be formed of a plurality of different stages include a multiplexer (mux) stage 31, a pre-driver stage 34, a current source stage 40, and an output switch stage 46. While shown in the embodiment of FIG. 1 with these particular stages, in other embodiments different stages or configurations may be present to provide a controlled current source onto a channel based upon a combination of selected tap delays.

A single driver 30 is discussed for purposes of explanation, as each driver 30 may include identical circuitry. Thus as shown in FIG. 1, a multiplexer 32 is coupled to receive the incoming tap coefficients, which are provided at a selected rate (e.g., at half-rate, quad-rate or at rate). Multiplexer 32 is controlled via a plurality of control signals or control settings C0-C2 that determine which tap coefficient driver 30 will use. The multiplexers of the multiple drivers 30 may be referred to herein as a "mux farm". The number of multiplexers in a mux farm may vary in different embodiments. In one particular embodiment, 64 individual multiplexers may be present. From mux stage 31, the selected tap coefficient is coupled to pre-driver stage 34 that includes an inverting buffer 36 and a non-inverting buffer 38, which are controlled by drive control signals C3-C4. These drive control signals provide a sign and constant value to the signal received from mux 32. Pre-driver stage 34 thus conditions the selected tap coefficient based on the two control signals to generate a pair of conditioned pre-drive signals. As an example, setting the control settings C3-C4 to either '1' or '0', the output of corresponding pre-driver stage 34 may be pulled either to 'VCC' or 'VSS'. This in turn switches the current on (if 'VCC') or off (if 'VSS') in output switch stage 46. Hence the common mode final output may be skewed either up or down. This feature may be useful as a design for test (DFT) hook that can stress the receiver of an input/output (IO) link. Accordingly, from pre-driver stage 34, these signals are used to control output switch stage 46 formed of a pair of switches 44 and 45. As shown in the embodiment of FIG. 1, switches 44 and 45 may be metal-oxide-semiconductor field effect transistors (MOSFETS), and more specifically, P-channel MOSFETS, although other configurations are possible. In such manner, output switch stage 46 gates current source stage 40 that includes a current source 42 to thereby pass a current onto channel 50. A control signal C5 is used to control current source 42. While not shown in FIG. 1, in some implementations, possible distortion due to a long path through the plurality of drivers may be resolved via addition of a pipeline stage.

As further shown in FIG. 1, a selection generator 60 may be used to provide the control signals for mux stage 31 and pre-driver stage 34. In various embodiments, selection generator 60 may act as a decoder to control each mux stage 31 (and each pre-driver stage 34). Accordingly, selection generator 60 provides tap and weight values for each driver 30. Based upon the control signals provided to each driver 30, a summed signal is generated on channel 50 via the combined outputs. While shown in the embodiment of FIG. 1 as including 64 such drivers, it is to be understood that more or fewer drivers may be present in other embodiments. Further, in other embodiments, any other type of front end pre-driver and driver combination may be used in place of driver 30 shown in FIG. 1.

Additionally, a bias controller 65 may be used to provide a control signal to current source stage 40 of each driver 30. As shown in the embodiment of FIG. 1, a single control bit C5 is sent to each of the individual current sources 42. Bias controller 65 may control at least certain ones of current sources 42 to be in a non-conducting (i.e., power down) status. However, other control schemes are possible. Further, while shown as separate controllers, in some embodiments selection generator 60 and bias controller 65 may be implemented within a single structure. Still further, in different embodiments selection generator 60 and bias controller 65 may be implemented in hardware, software, firmware or combination thereof. As one example, these components may be digital logic/combinational circuit blocks. Because the coefficients are known, each of the individual drivers 30 may be controlled with static signals, i.e., time invariant or slowly changing (e.g., DC) signals. Thus upon adaptation into a system control signals C0-C5 may remain static in some embodiments. That is, in a system the control settings may be pre-determined and set through, for example, basic input/output system (BIOS) or firmware. Therefore the control signals propagate during a reset, initialization sequence of an initial link start up.

Using equalizer 10 of FIG. 1, a summed signal appearing on channel 50 may be derived in accordance with the following equation:

$$Y = \sum_{i=0}^{N-1} a_i \chi_i + CM \qquad \text{(Eq. 1)}$$

where $a_i$ corresponds to the weight of the given driver branch and $X_i$ corresponds to the selected delay element, and CM corresponds to the common mode for the associated driver, which may be determined based on the value of the constant drive control signal (e.g., one of drive control signals C4 and C5). Furthermore, to maintain good linearity, the following equation may be met to avoid pattern dependent non-linearity resulting in loss of margins:

$$63 = \sum_{i=0}^{N-1} |a_i| + |CM| \qquad \text{(Eq. 2)}$$

Therefore in accordance with Equations 1 and 2, one can associate current sources to coefficients statically. In other words, assigning a different number of current sources to each tap results in different weighted taps. According, a fully programmable multi-tap equalization architecture is provided, while maintaining fixed (i.e., non-programmable) filter coefficients, avoiding computation costs.

According to various embodiments, the current sources may be selected from an ordered set with coefficients in a desired order. For example, the order may associate different subsets of the drivers with different tap weightings via a current source number and tap number order. Note that weights may be determined based on a system setup, namely interconnect insertion loss, reflections, and the like. In other words, based on an impulse response of the channel, the equalizer response is predetermined and pre-programmed into the mux farm using the control signals. For example, assume a channel is to be driven by 64 independently controlled drivers (i.e., 64 current sources) having a two-tap equalization with weights allocated as 25% positive common mode, 50% cursor, and 25% first post-cursor tap. In this example, the order will be (0-15, $-X_0$), (16-47, $+X_{-1}$), and (48-63, $-X_{-2}$). Thus the first 16 current sources corresponding to the 25% positive common mode portion of the signal are provided with a selected tap value of $X_0$ having a negative sign bit; the next 32 current sources corresponding to the 50% cursor portion of the signal are provided with a selected tap value of $X_{-1}$ having a positive sign; and the final 16 current sources corresponding to the 25% first post-cursor portion of the signal are provided with a tap value of $X_{-2}$ having a negative sign bit.

Figure 2:
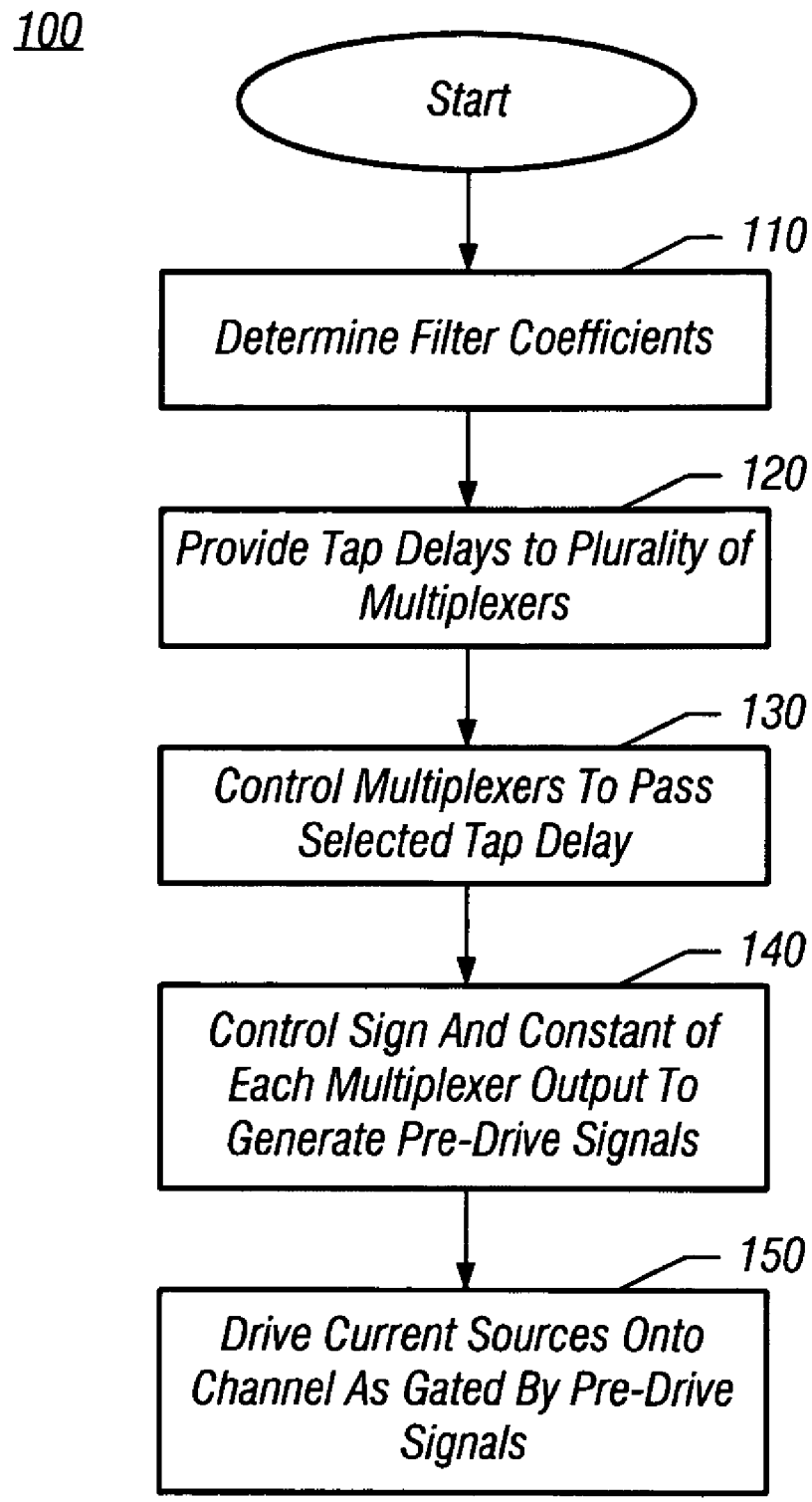
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used to transmit equalized signals onto an interconnect coupled between a first device and a second device. Method 100 may begin by determining filter coefficients (block 110). In various embodiments, a digital filter may be designed to be non-programmable (i.e., non-adaptive). That is, a digital filter in accordance with an embodiment of the present invention may be designed with known, optimal filter coefficients, as described above. Accordingly, a digital filter may be designed that uses these predetermined filter coefficients, avoiding run-time computation costs to determine coefficients.

Still referring to FIG. 2, during operation of a system including the equalizer, tap delays from the filter may be provided to a plurality of multiplexers that form a first stage of driver circuitry (block 120). These multiplexers each may be controlled to pass a selected one of the tap delays to additional stages of the driver circuitry (block 130). Specifically, each multiplexer may be coupled to receive control signals that are used to select which one of the tap delays to pass via the multiplexer output.

Still referring to FIG. 2, the multiplexer output corresponding to a selected filter tap may be controlled to have a selected sign and constant value according to additional control signals (block 140). These control signals may be provided to a pre-driver stage of the driver circuitry. Finally, the pre-drive signals may be used to gate a current source of the driver circuitry onto a channel (i.e., an interconnect) (block 150). The sum of all of the current sources of the driver circuitry may thus form the output signal that is transmitted on the interconnect. While described with this particular implementation in the embodiment of FIG. 2, it is to be understood that the scope of the present invention is not so limited and in other embodiments, different manners of equalizing a signal may be effected. For example, preselected tap coefficients may be provided via hardwired or other logic circuitry to pass appropriate delays from filter onto current source to generate a signal for transmission. Accordingly, in embodiments of the present invention, maximum flexibility in terms of setting weights of equalization to different taps is possible while maintaining low latency and low power consumption.

When high-speed signals generated in each equalization tap are routed to destination drivers, there is potential timing skew due to disparity in routing length. Depending on how large the skew is with respect total phase delay allowed in a design, such skew may be considerable in terms of unit intervals (UI). Accordingly, in some embodiments, the high-speed signals (e.g., clock and data signals) may be routed close to the destination drivers.

Figure 3:
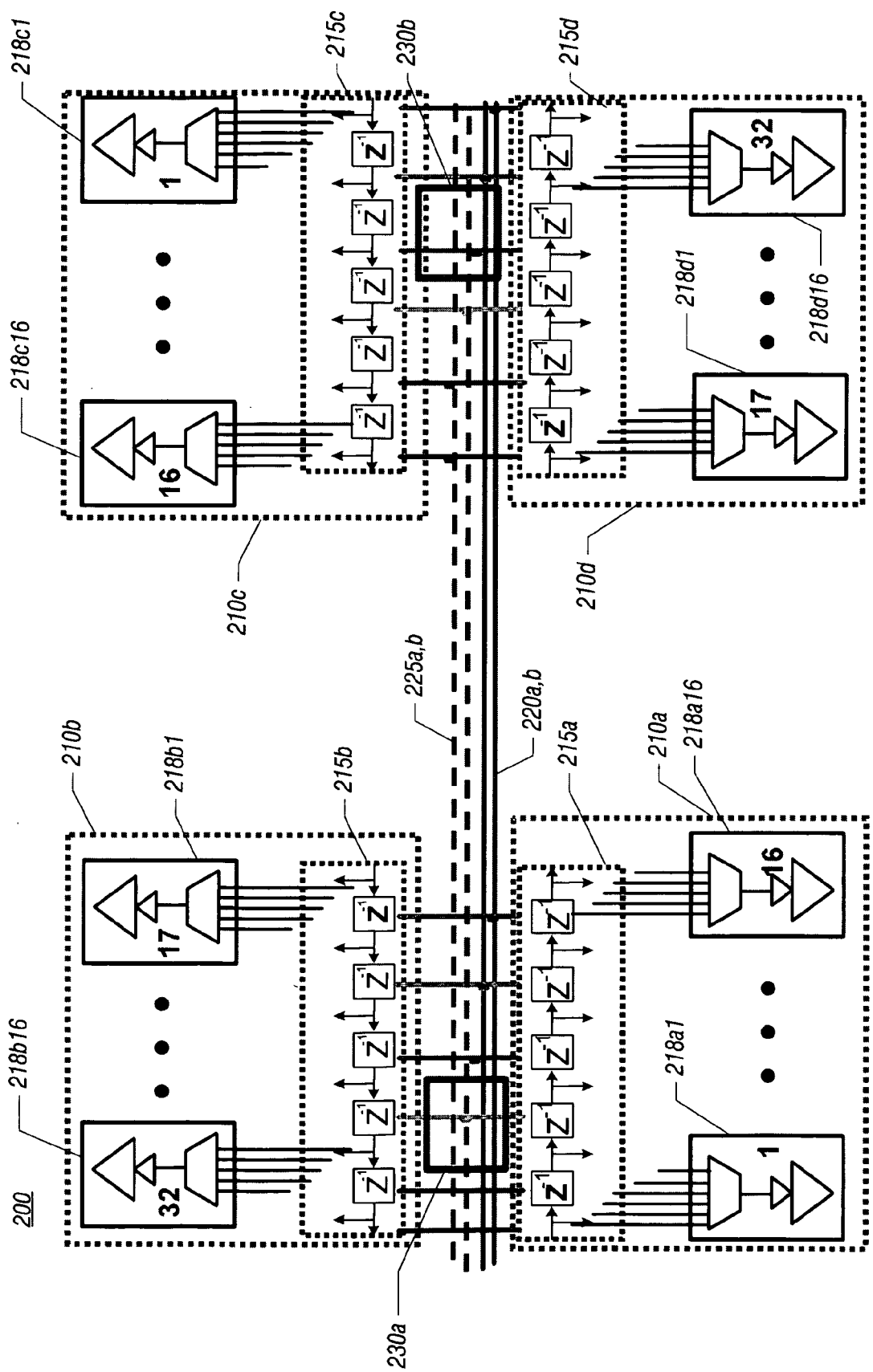
FIG. 3 is a transmitter layout in accordance with one embodiment of the present invention.

Referring now to FIG. 3, shown is a transmitter layout in accordance with one embodiment of the present invention. As shown in FIG. 3, transmitter 200 includes four driver quadrants 210a-210d (generically driver quadrant 210). Each driver quadrant 210 includes a filter 215a-215d (generically filter 215) that is a scaled-down tap generation block, and a plurality of driver circuits $218_{a1}$-$218_{a16}$, $218_{b1}$-$218_{b16}$, $218_{c1}$-$218_{c16}$, and $218_{d1}$-$218_{d16}$ (generically driver 218). In various embodiments, drivers 218 may be controlled as described above with reference to the embodiment of FIG. 1.

Because the layout shown in FIG. 3 has been divided into four groups each with 16 individual drivers (for example), the fan-out of high-speed tap data for filter 215 could be intense. In some embodiments a higher-level metal layer, e.g., a metal 4 (M4), metal 5 (M5) or a higher layer may be used to route the data with a wider pitch. Also, such routing may be implemented in a short distance so that incoming data that is received, for example, from a serializer output, is distributed to the individual groups, where the taps are generated by scaled-down generator blocks. These blocks may also ensure the loading on each tap output is equal across all the taps.

Still referring to FIG. 3, transmitter 200 further includes a first pad 230a and a second pad 230b that provide an interconnection for a link, which may be a routing link between different devices, boards, a repeater link or the like. To reduce routing complexity, incoming data (e.g., sent from a serializer not shown in FIG. 3) may be routed to driver quadrants 210a-210d along data paths 220a and 220b. Data paths 220a and 220b may be matched even and odd data routing to support de-multiplexing to reduce propagation rates, thus reducing power consumption levels. That is, because data and clock signals may run at very high speeds, in some embodiments these signals may be de-multiplexed to reduce the frequency and hence power dissipation. Further shown in FIG. 3 are clock routing paths 225a and 225b that provide a clock signal and an inverted clock signal to driver quadrants 210a-210d. As discussed, these high-speed paths (i.e., paths 220a and 220b and paths 225a and 225b) may be formed in a high order metal layer, such as a metal 4 (M4) layer.

Figure 4:
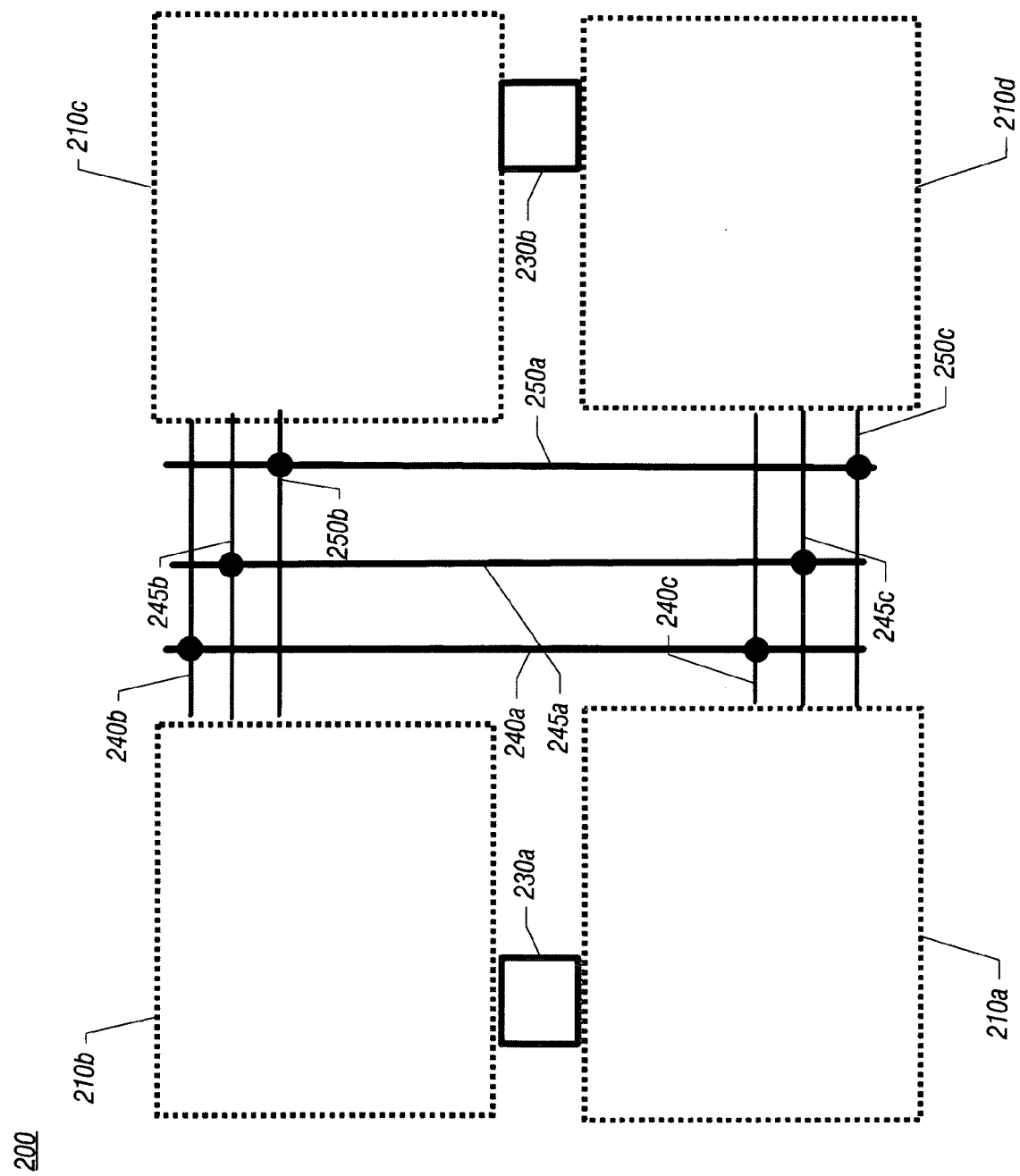
FIG. 4 is a different layer of the transmitter layout of FIG. 3.

Referring now to FIG. 4, shown is a different layer of the transmitter layout of FIG. 3 that includes control signals for controlling driver circuits 218 of driver quadrants 210a-210d. Note that the quadrants do not show the circuitry of FIG. 3 for ease of illustration. As shown in FIG. 4, a plurality of low-speed control signal paths 240a, 245a, and 250a may route control signals used for the driver circuits of each of driver quadrants 210a-210d. As shown in FIG. 4, these control signal paths may be routed perpendicular to the routing of the high-speed clock and data signals in FIG. 3. To route these control signals to the individual driver circuits within each of quadrants 210a-210d, control signal paths 240b and 240c may couple control signals of path 240a to driver quadrants 210b and 210c and driver quadrants 210a and 210d, respectively. Similarly, control signal paths 245b and 245c may couple control signals of path 245a to driver quadrants 210b and 210c and driver quadrants 210a and 210d, respectively. Further, control signal paths 250b and 250c may couple control signals of path 250a to driver quadrants 210b and 210c and driver quadrants 210a and 210d. In some embodiments, these control signal paths may be formed in a lower metal layer, for example, a metal 3 (M3) layer to provide these low speed signals with a smaller pitch as these control signals are low speed (i.e., DC) signals that can be implemented in minimum pitch metals. In one embodiment, for three bundles (i.e., separate bundles for C0-C2, C3-C4 and C5 of FIG. 1) for all of 64 drivers only approximately 20 microns (μm) of routing channel per bundle may be used in some embodiments.

In alternate embodiments, instead of implementing a separate filter for each driver quadrant, a central tap generation block may be provided and tap coefficients may be sent from the central tap generation block to different driver quadrants. Furthermore, in some implementations repeater filters may be present within the individual driver quadrants to improve the quality of tap coefficients. In yet other implementations, a central tap generation block may provide tap coefficients to local latches associated with each driver quadrant. While discussed in these embodiments as implementing a floorplan having a quadrant design, it is to be understood that the scope of the present invention is not so limited and in other embodiments, a total number of driver circuits may be differently divided, for example, into six segments, eight segments or another such number of driver segments. More so, while shown in the embodiments of FIG. 3 and FIG. 4 as including 16 drivers within each driver quadrant, a different number of driver circuits may be present in other embodiments.

Figure 5:
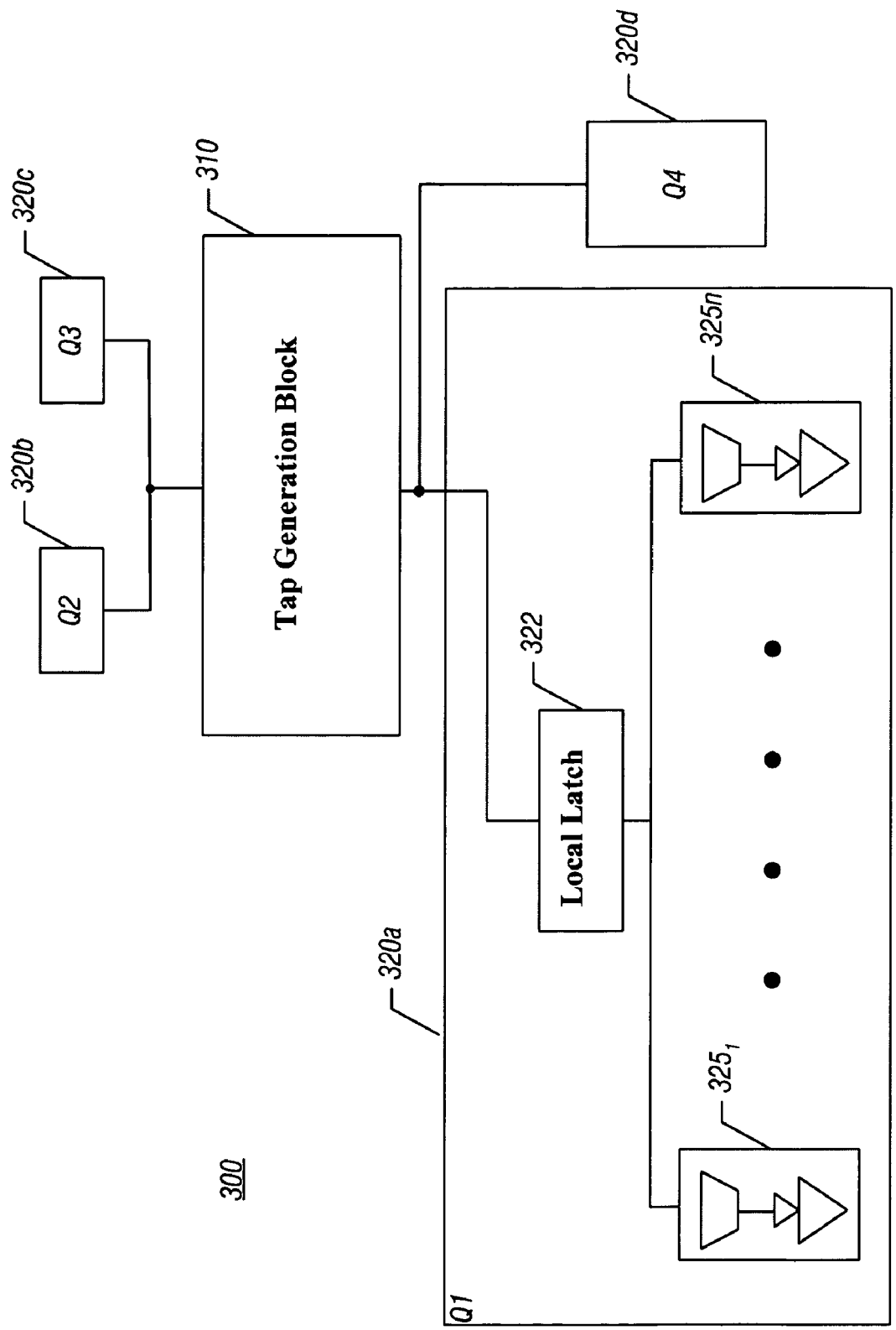
FIG. 5 is a block diagram of a transmitter floorplan in accordance with another embodiment of the present invention.

Referring now to FIG. 5, shown is a block diagram of a transmitter floorplan in accordance with another embodiment of the present invention. As shown in FIG. 5, transmitter 300 may include a central tap generation block 310 to generate a plurality of tap coefficients in accordance with an embodiment of the present invention. In this embodiment, tap generation block 310 provides only high-speed signals, namely differential clock and serialized data outputs to each of driver quadrants 320a -320d. Also shown in FIG. 5 are further details of a representative driver quadrant 320a. Driver quadrant 320a includes a local latch 322 which is coupled to a plurality of driver circuits $325_1$-$325_n$. Local latch 322 may be used to locally generate the tap coefficients and provide them to driver circuits $325_1$-$325_n$, minimizing any skew. While shown with this particular implementation in the embodiment of FIG. 5, different implementations using a central tap generation block and local latches may be effected in other embodiments.

Figure 6:
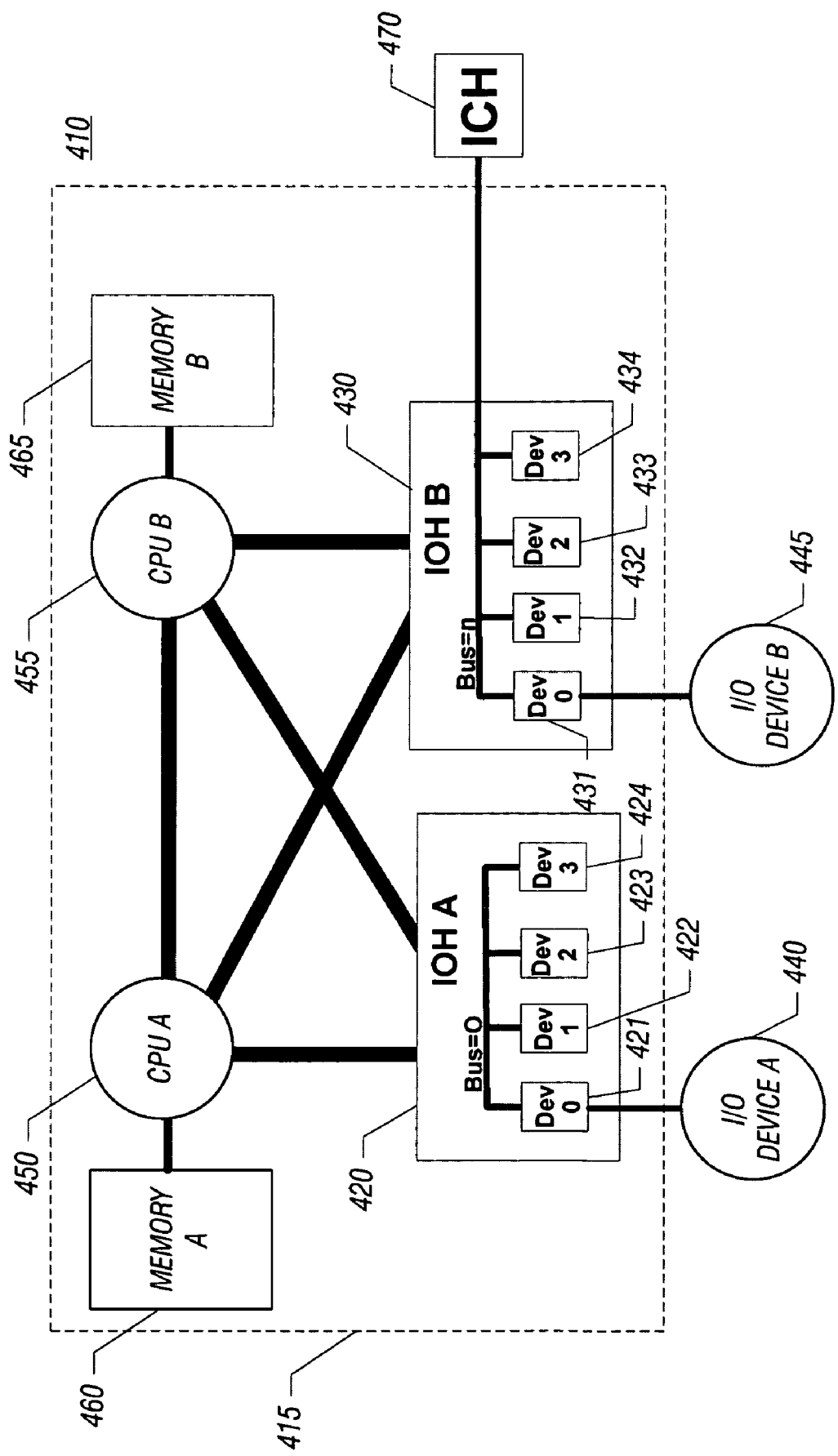
FIG. 6 is a block diagram of a system in accordance with one embodiment of the present invention.

Referring now to FIG. 6, shown is a block diagram of a system in accordance with one embodiment of the present invention. As shown in FIG. 6, system 410 may be a multiprocessor system including a coherent interface in accordance with an embodiment of the present invention. That is, system 410 may represent any one of a desired desktop, mobile, server or other such platform, in different embodiments. In certain embodiments, interconnections between different components of FIG. 6 may be point-to-point interconnects that provide for coherent shared memory within system 410, and in one such embodiment the interconnects and protocols used to communicate therebetween may form a coherent system. In such manner, multiple processors, memories, and other components of system 410 may coherently interface with each other.

Referring to FIG. 6, system 410 may include a first processor 450 (central processing unit (CPU) A) and a second processor 455 (CPU B). In various embodiments, each processor may include memory controller functionality such that the processors may directly interface with an associated shared memory via a point-to-point interconnect. For example, as shown in FIG. 6, processor 450 may be coupled to a memory 460 (memory A) via a point-to-point interconnect and processor 455 may be coupled to a memory 465 (memory B) via a similar point-to-point interconnect. More so, processors 450 and 455 may be coupled to each other via a point-to-point interconnect. Using embodiments of the present invention, equalized transmission of data between processors 450 and 455 may occur. Accordingly, these processors may include equalization circuitry in accordance with an embodiment of the present invention. Similarly, each of processors 450 and 455 may be coupled via point-to-point interconnects to each of a first input/output (I/O) hub (IOH A) 420 and a second IOH 430 (IOH B), which may also include equalization circuitry.

In the embodiment of FIG. 6, all components within box 415 may collectively form a coherent system (i.e., coherent system 415). Such a coherent system may accommodate coherent transactions without any ordering between channels through which transactions flow. While discussed herein as a coherent system, it is to be understood that both coherent and non-coherent transactions may be passed through and acted upon by components within the system. While the embodiment of FIG. 6 shows a platform topology having two processors and two I/O hubs, it is to be understood that other embodiments may include more or fewer such components. For example, a single processor system may be implemented having a single processor, a single I/O hub and associated I/O devices coupled thereto. Alternately, a multiprocessor system having 4, 8, 16, 32 or another number of processors may be implemented, and an appropriate number of I/O hubs and other components may be coupled thereto.

As shown in FIG. 6, I/O hubs 420 and 430 may each include a plurality of ports (e.g., ports 421-424 in IOH 420 and ports 431-434 in IOH 430) to interface with I/O devices coupled thereto. For example, in certain embodiments, such I/O devices may be devices in accordance with one or more bus schemes. In one embodiment, such I/O devices may be PCI Express™ devices. For simplicity, FIG. 6 shows a single I/O device coupled to each I/O hub, namely I/O device (I/O device A) 440 coupled via port 421 to IOH 420 and I/O device (I/O device B) 445 coupled via port 431 to IOH 430. It is to be understood that the number of ports in an I/O hub in accordance with an embodiment of the present invention may vary, and the number of ports and devices coupled thereto shown in FIG. 6 are for illustrative purposes only.

Also shown in FIG. 6 is a legacy I/O controller hub (ICH) 470 coupled to IOH 430. In one embodiment, ICH 470 may be used to couple legacy devices such as a keyboard, mouse, and Universal Serial Bus (USB) devices (e.g., devices in accordance with the USB Specification Rev. 2.0 (published December 2000)) to coherent system 415.

While the I/O hubs shown in FIG. 6 include a plurality of ports, it is to be understood that the hubs may realize various functions using a combination of hardware, firmware and software. Such hardware, firmware, and software may be used so that the I/O hub may act as an interface between coherent system 415 (e.g., shared memories 460 and 465, processors 450 and 455, and IOHs 420 and 430), and devices coupled thereto such as I/O devices 440 and 445. In addition, the I/O hubs of FIG. 6 may be used to support various bus or other communication protocols of devices coupled thereto. IOH 420 and IOH 430 may act as agents to provide a central connection between two or more communication links. In particular, IOH 420 and IOH 430 may be high-speed link agents that provide a connection between different I/O devices coupled to coherent system 415. In various embodiments, other components within coherent system 415 may also act as such agents.

Embodiments may be implemented in a computer program. As such, these embodiments may be stored on a medium having stored thereon instructions which can be used to program a system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read only memories (ROMs), random access memories (RAMs) such as dynamic RAMs (DRAMs) and static RAMs (SRAMs), erasable programmable read-only memories (EPROMs), electrically erasable programmable read-only memories (EEPROMs), flash memories, magnetic or optical cards, or any type of media suitable for storing or transmitting electronic instructions. Similarly, embodiments may be implemented as software modules executed by a programmable control device, such as a general-purpose processor or a custom designed state machine.

Using embodiments of the present invention, higher data rates may be enabled on various technologies including, for example, a fully buffered dual in-line memory (FBD) architecture, a serial point-to-point interconnect or a PCI Express™ architecture. Furthermore, transmission of data or over extended lengths of interconnects using repeaters over multiple boards may be improved. Using embodiments of the present invention, a transmitter equalization scheme provides for maximum flexibility for tap weights, while enabling low latency and low power operation. In some embodiments, tiling may ease layout constraints, as the number of current sources need not be according to a power of two. Furthermore, considerable power savings are possible. Embodiments also provide a modular and scalable architecture, allowing scaling across process generation, and as the delay elements and control signals can be generated at slower speeds, due to their substantially DC behavior. Still further, embodiments provide maximum flexibility in terms of setting weights of equalization to different taps and provide a DFT hook to change common mode while stressing a receiver during a testing operation.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a filter having a plurality of delay elements to generate a plurality of tap delays based on an incoming signal;
    a plurality of multiplexers coupled to the plurality of tap delays;
    a plurality of drivers each coupled to one of the plurality of multiplexers to generate a current controlled by the one of the plurality of tap delays passed by the associated multiplexer; and
    a controller to control each of the plurality of multiplexers to pass one of the plurality of tap delays, wherein the passed tap delays are to be summed to generate a signal for transmission on an interconnect.

2. The apparatus of claim 1, wherein the plurality of delay elements are pre-programmed.

3. The apparatus of claim 1, wherein the current from each of the plurality of drivers is summed into the signal for transmission on the interconnect.

4. The apparatus of claim 1, wherein each of the plurality of drivers comprises:
    a pre-driver stage to generate a first control voltage and second control voltage based on the one of the plurality of tap delays passed by the associated multiplexer; and
    a driver stage gated by the first control voltage and the second control voltage to generate a differential current.

5. The apparatus of claim 4, wherein the controller is to control the pre-driver stage to adjust a sign and common mode value of the one of the plurality of tap delays passed by the associated multiplexer.

6. The apparatus of claim 1, wherein a first portion of the plurality of multiplexers is to generate a pre-cursor signal, a second portion of the plurality of multiplexers is to generate a cursor signal, and a third portion of the plurality of multiplexers is to generate a post-cursor signal.

7. The apparatus of claim 1, wherein the controller is to statically control the plurality of multiplexers.

8. The apparatus of claim 1, further comprising a plurality of filters, each of the plurality of filters to provide the plurality of tap delays to an associated portion of the plurality of multiplexers.

9. The apparatus of claim 8, further comprising control signal paths to route control signals to control the plurality of multiplexers, wherein the control signal paths are routed in a first metal layer.

10. The apparatus of claim 9, further comprising a data signal path to route the incoming signal to the plurality of filters, wherein the data signal path is routed in a second metal layer, the second metal layer higher than the first metal layer.

11. A method comprising:
    associating a first plurality of current sources with a first tap coefficient and associating a second plurality of current sources with a second tap coefficient, the associating via control signals from a controller; and
    gating a first plurality of output switches coupled to the first plurality of current sources using the first tap coefficient and gating a second plurality of output switches coupled to the second plurality of current sources using the second tap coefficient, to drive the first plurality of current sources and the second plurality of current sources onto an interconnect as an output signal formed from a sum of the first and second plurality of current sources.

12. The method of claim 11, further comprising routing a data signal to a filter to generate the first tap coefficient and the second tap coefficient.

13. The method of claim 12, further comprising de-multiplexing the data signal.

14. The method of claim 11, wherein associating the first plurality of current sources comprises controlling a first plurality of multiplexers to pass the first tap coefficient.

15. The method of claim 14, further comprising conditioning the passed first tap coefficient to form a differential signal.

16. The method of claim 15, further comprising gating the first plurality of output switches with the differential signal.

17. The method of claim 14, further comprising statically controlling the first plurality of multiplexers.

18. The method of claim 11, further comprising biasing at least some of the first plurality of current sources to be in a power down state.

19. The method of claim 11, wherein the associating comprises decoding a plurality of tap coefficients including the first tap coefficient and the second tap coefficient to pass a first control voltage to the first plurality of output switches and to pass a second control voltage to the second plurality of output switches.

20. A system comprising:
    a point-to-point interconnect;
    a plurality of multiplexers to receive a plurality of filter delay outputs, each of the plurality of multiplexers to pass a selected one of the plurality of filter delay outputs; and
    a plurality of driver stages each coupled to one of the plurality of multiplexers to provide an equalized current source to the point-to-point interconnect under control of the selected one of the plurality of filter delay outputs, wherein an output signal on the interconnect corresponds to a sum of the equalized current source of each of the plurality of driver stages.

21. The system of claim 20, further comprising a decoder coupled to the plurality of multiplexers to control each of the plurality of multiplexers to pass the selected one of the plurality of filter delay outputs.

22. The system of claim 20, further comprising a pre-programmed filter to provide the plurality of filter delay outputs based upon a data signal to be transmitted on the point-to-point interconnect.

23. An article comprising a machine-accessible medium including instructions that when executed cause a system to:
generate decoder signals to select one of a plurality of filter tap coefficients to pass through a first stage of each of a plurality of driver circuits;
generate control signals to condition the selected filter tap coefficient in a second stage of each of the driver circuits; and
generate a control signal to control a current source of each of the plurality of driver circuits, wherein the current source is gated by the associated conditioned selected filter tap coefficient to pass a current onto an interconnect, wherein summed currents of the plurality of driver circuits is to form a signal.

24. The article of claim 23, further comprising instructions that when executed cause the system to generate the decoder signals based on an equalization for the signal to be transmitted via interconnect coupled to the plurality of driver circuits.

25. The article of claim 23, further comprising instructions that when executed cause the system to statically generate the decoder signals.

* * * * *

UNITED STATES PATENT AND TRADEMARK OFFICE
CERTIFICATE OF CORRECTION

PATENT NO. : 7,596,174 B2  Page 1 of 1
APPLICATION NO. : 11/237118
DATED : September 29, 2009
INVENTOR(S) : Canagasaby et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Twenty-eighth Day of September, 2010

David J. Kappos
*Director of the United States Patent and Trademark Office*